United States Patent [19]

Vaughan

[11] Patent Number: 4,534,947
[45] Date of Patent: Aug. 13, 1985

[54] PROCESS FOR DIRECT SYNTHESIS OF SODIUM- AND POTASSIUM-CONTAINING ZEOLITE A

[75] Inventor: David E. W. Vaughan, Flemington, N.J.

[73] Assignee: Exxon Research and Engineering Co., Florham Park, N.J.

[21] Appl. No.: 606,939

[22] Filed: May 4, 1984

[51] Int. Cl.$^3$ .............................................. C01B 33/28
[52] U.S. Cl. .................................... 423/329; 423/328; 502/60
[58] Field of Search ................... 423/328, 329; 502/60

[56] References Cited

U.S. PATENT DOCUMENTS

| | | | |
|---|---|---|---|
| 2,882,243 | 4/1959 | Milton | 423/328 |
| 3,071,434 | 1/1963 | Frilette | 423/329 |
| 4,340,573 | 7/1982 | Vaughan | 423/329 |

FOREIGN PATENT DOCUMENTS 1144440  3/1969  United Kingdom ................ 423/329

*Primary Examiner*—Edward J. Meros
*Assistant Examiner*—Robert M. Alway
*Attorney, Agent, or Firm*—E. Thomas Wheelock

[57] ABSTRACT

Zeolite A containing sodium and potassium ions, otherwise known as 3 Å molecular sieve, may be prepared by a direct route when the aqueous aluminosilicate reaction mixture to be aged at elevated temperatures contains a mole ratio of $Na_2O$ to $Na_2O$ and $K_2O$ which is greater by a factor of about 1.1 than the mole ratio of $Na_2O$ to $Na_2O$ and $K_2O$ in the zeolite A product. Preferably, the reaction mixture also contains zeolitic nucleation seeds to promote crystallization of the product.

6 Claims, 1 Drawing Figure

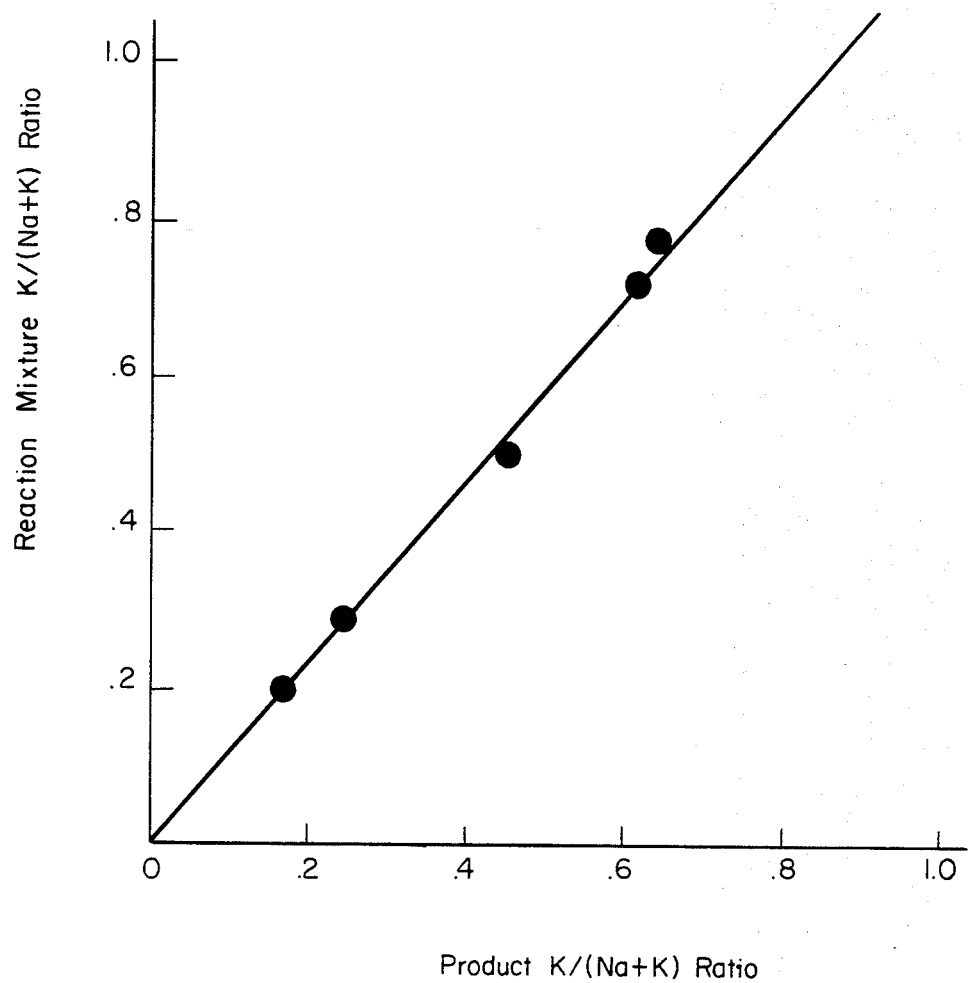

PROCESS FOR DIRECT SYNTHESIS OF SODIUM- AND POTASSIUM-CONTAINING ZEOLITE A

FIELD OF THE INVENTION

This invention relates to a process for the direct preparation of zeolite A containing sodium and potassium cations, also known as 3 Å molecular sieves, by reaction of an aluminosilicate mixture having an appropriate synthesis composition range to obtain the desired Na/K ratio in the zeolite product.

BACKGROUND OF THE INVENTION

Zeolite A is a synthetic zeolite first described in U.S. Pat. No. 2,882,243 and having a composition, expressed in terms of mole ratios of oxides, in the range:

$$1.0 \pm 0.2 M_{2/n}O : Al_2O_3 : 1.85 \pm 0.5 SiO_2 : yH_2O$$

where M is at least one of hydrogen, ammonium, metals in groups and I and II of the periodic table, and the transition metals of the periodic table, n is the valence of M, and y is any value up to about 6. Depending on the cation(s) M present in the composition, zeolite A may be employed as a 3 Å (Na—K), 4 Å (Na only) or 5 Å (Na—Ca) molecular sieve in drying and n-isoparaffin separations in the petroleum and natural gas industries.

The 3 Å molecular sieves, in particular, are used primarily as drying agents for natural gas, cracked gases, a wide range of petrochemical gas streams, as a drying agent in all kinds of refrigerant systems and other dessicant applications. A more complete list of usages is given by J. J. Collins (Chem. Engr. Progress, v. 64, p. 66, 1968). Zeolite 3 Å usually contains sufficient large potassium cations within the structure to block the entry of all molecules except water. This requires the replacement of between 60 and 90% of the sodium cations normally present in zeolite A with potassium cations.

It is known to prepare, for example, zeolite E (U.S. Pat. No. 2,962,355), zeolite W (U.S. Pat. No. 3,012,853), zeolite L (3,216,789), faujasite molecular sieves (U.S. Pat. No. 4,175,059) and certain sodium-potassium zeolites (U.S. Pat. No. 3,374,058) by directly reacting selected proportions of Na$_2$O, K$_2$O, Al$_2$O$_3$ and SiO$_2$. In preparing zeolite A or 3 Å molecular sieves, however, the pure sodium form of zeolite A is first synthesized, followed by an ion exchange technique using potassium salt solutions in up to three stages to replace a portion of the sodium. These stages involve batch exchange procedures, filtration and washing prior to the crystallization step. See, for example, U.S. Pat. No. 4,160,011. Such a method is costly because of the number of unit operations required thereby. Each cation exchange step is followed by filtration or centrifugation, which involve polluting effluents, loss of product, time and equipment.

SUMMARY OF THE INVENTION

The present invention provides a process for directly preparing zeolite, Na or K type A or 3 Å molecular sieves without the need for an ion exchange procedure and thus represents a more cost-efficient process. Specifically, the process herein comprises the steps of:

(a) preparing a reaction mixture comprising a seed source, a sodium salt, a potassium salt, water, a source of alumina and a source of silica, said reaction mixture having a mole ratio of Na$_2$O/(Na$_2$O+K$_2$O) which is larger than the mole ratio of Na$_2$O/(Na$_2$O+K$_2$O) in the zeolite A product by a factor of about 1.1 and having a composition, expressed in mole ratios of oxides, within the ranges:

(Na$_2$O+K$_2$O):Al$_2$O$_3$—1.2 to 2.6
SiO$_2$:Al$_2$O$_3$—1.8 to 2.5
H$_2$O:Al$_2$O$_3$—40 to 100, (b) maintaining the reaction mixture at a temperature of between about 60° and 120° C. for a time sufficient to form the desired crystalline zeolite A product, and (c) filtering and washing.

Thus, by the process herein a particular Na to K ratio in the 3 Å molecular sieve product may be prepared by adjusting the ratio of Na to K in the reaction mixture to an appropriate level. The resulting product is directly useful as a drying agent without further K$^+$ cation exchange.

BRIEF DESCRIPTION OF THE DRAWINGS

FIG. 1 illustrates a graphical plot of the ratio of K to Na+K in the reaction mixture as a function of that ratio in the product.

DESCRIPTION OF THE PREFERRED EMBODIMENTS

In the process of this invention a reaction mixture is prepared, generally as a slurry, comprising a sodium salt (preferably sodium hydroxide or sodium silicate), a potassium salt (preferably potassium hydroxide or potassium silicate), water, a source of alumina, a source of silica, and a source of seeds suitable for inducing zeolite A crystallization. Examples of sources of alumina include Al$_2$O$_3$.3H$_2$O, kaolin, halloysite, metakaolin, aluminum sulfate and the like. Preferably, the source of alumina is sodium or potassium aluminate made by dissolving Al$_2$O$_3$.3H$_2$O in KOH or NaOH solutions at 60°–100° C. The source of silica may include, e.g., silica gels, silicic acid, aqueous colloidal silica sols and alkali metal silicates such as potassium or sodium silicate. Zeolite A products of high purity are preferably prepared using potassium silicate as the potassium source, by virtue of its lower cost. The seed source is usually more than about 3% of Na or K type A product but may be NaA or other zeolite A inducing nucleation agents. The absence of this seed source causes the formation of zeolite F (U.S. Pat. No. 2,996,358), or mixtures of A, F and X, particularly at higher K/Na ratios.

The amounts of ingredients in the reaction mixture will vary considerably depending, e.g., on the types of ingredients employed (e.g., the source of silica) and the particular composition ultimately desired. Thus, for example, the ratio of Na$_2$O/(Na$_2$O+K$_2$O) in the reaction mixture will be greater by a factor of about 1.1 than the ratio in the final product. In general, however, the reltive amounts of ingredients will be such that the reaction mixture will have a composition, in terms of mole ratios of oxides, within the following ranges:

| Oxide Constituents | Ranges of Mole Ratios |
| --- | --- |
| (K$_2$O + Na$_2$O):Al$_2$O$_3$ | 1.2 to 2.6 |
| SiO$_2$:Al$_2$O$_3$ | 1.8 to 2.5 |
| H$_2$O:Al$_2$O$_3$ | 40 to 100 |

The ratio of K$_2$O:Al$_2$O$_3$ will generally range from 1.0 to 1.7, preferably 1.3 to 1.7, and the ratio of Na$_2$O:Al$_2$O$_3$ will ordinarily range from 0.3 to 1, preferably 0.3 to 0.8. The preferred mole ratio of (K$_2$O+Na$_2$O):Al$_2$O$_3$ is 1.4 to 2.1, the preferred mole ratio of $SiO_2:Al_2O_3$ is 1.9 to 2.2, and the preferred mole ratio of $H_2O:Al_2O_3$ is 50 to 80.

The order of mixture of ingredients is not essential, but one method, using preferred ingredients, involves adding to an alkali metal silicate solution a solution of sodium hydroxide (and potassium hydroxide, ordinarily if the alkali metal silicate is not potassium silicate) in water followed by the alumina as sodium or potassium aluminate, followed by an aluminum sulfate solution in water. The reaction mixture may be prepared in a container made of metal or glass or the like which is preferably closed to prevent water loss, or equipped to maintain constant water levels.

In the preferred embodiments at higher K/Na ratios the reaction mixture also contains zeolitic nucleation centers or seeds which assist in initiating crystallization. These seeds are generally present in the reaction mixture in an amount about 2 to 10% by weight of the total reaction mixture. These seeds may be mixed in any order with the other ingredients of the reaction mixture. The composition of these seeds may vary widely, and methods for preparing some of them are described, e.g., in U.S. Pat. Nos. 4,340,573 and 3,808,326. Generally, they will have a composition, expressed in terms of mole ratios of oxides, as follows:

$$xM_{n/2}O:Al_2O_3:ySiO_2:zH_2O$$

where x, y and z may vary widely, M is a cation and n is the valence of the cation. One preferred composition herein is of the formula:

$$13.3Na_2O:Al_2O_3:12.5SiO_2:267 H_2O$$

The crystallization of Na or K type A zeolite can also be initiated by adding similar amounts of product NaA or Na, K A zeolite, or by adding a portion of a previously crystallized slurry in a cascade made similar to that described in Serial No. 550890 for zeolite L. An inadequate level of seeds usually results in no product or an impure product.

The reaction mixture thus formed is placed in a reactor where it is maintained at a temperature of between about 60° and 120° C., preferably 80° and 100° C. for commercial purposes, to induce crystallization. Preferably, before the mixture is subjected to these temperatures it is homogenized by thorough blending so as to be substantially homogeneous in texture. This step is necessary to ensure that the zeolite product ultimately obtained is not a mixture of products and thus impure. The mixing may take place in any vessel in which complete mixing can be effected such as in a blender or other commercial mixer or a reaction vessel equipped with an agitator.

When the homogeneous mixture is heated at the above specified temperatures, it is maintained at autogenous pressures which will depend on the temperature employed. For example, pressures of 1 atm may be adequate for temperatures at the lower range but at higher temperatures of, e.g., 120° C. or more, higher pressures may be achieved. The amount of time required for heating will depend mainly on the temperature employed and the slurry composition, so that at 95° C. the heating may be carried out, e.g., for up to 6 hours whereas at about 110° C. the time period may be, 2 hours. In general, the period of heating will be from 1 to 4 hours until the maximum amount of crystals is formed of the desired zeolite product, i.e., of zeolite A crystals.

Whenever the term "zeolite A" is employed it is meant to refer to the zeolite A where M is a mixture of sodium and potassium cations (3 Å molecular sieves), which is fully described by U.S. Pat. No. 2,882,243, the entire disclosure of which is incorporated herein by reference.

The crystallization time may be shortened not only by adding more nucleation seeds to the reaction mixture, but also by aging the reaction slurry or a portion of the reaction slurry at about 10° to 40° C. for about 6 hours to 6 days prior to the step of heating at 80° to 100° C.

The product thus obtained may be used for the typical applications for which zeolite A (3 Å molecular sieves) is used. The direct synthesis herein facilitates its preparation and thereby renders the preparation less costly. By the word "direct" as used herein with reference to the preparation is meant that the reaction of the reaction mixture will result directly in Na—K zeolite A crystals suitable for 3 Å molecular sieve uses without the need for subsequent ion-exchange processes.

The examples which follow illustrate the efficacy of the invention. In all examples, parts and percentages are given by weight and temperatures in degrees Centigrade unless otherwise noted.

EXAMPLE 1

A reaction mixture having a slurry composition, expressed in terms of mole ratios of oxides, of:

$K_2O:Al_2O_3$—0.4
$Na_2O:Al_2O_3$—1.6
$SiO_2:Al_2O_3$—2
$H_2O:Al_2O_3$—60 was prepared by adding 107.8 g of sodium silicate solution ("N" brand of sodium silicate) to a blender. Then 17.9 g of a nucleation slurry having a composition of:

$$13.3Na_2O:Al_2O_3:12.5SiO_2:267H_2O$$

prepared by the process described in U.S. Pat. No. 4,340,573 was added to the blender. This was followed by addition of a solution prepared by dissolving under reflux conditions 23.2 g NaOH, 14.4 g $KOH.0.5H_2O$ and 40.7 g $Al_2O_3.3H_2O$ in 65 g $H_2O$. A solution of 7.2 g of $Al_2(SO_4)_3.18H_2O$ dissolved in 15 g $H_2O$ was added, and water was added in an amount to bring the total reaction mixture weight to 400 g. This mixture was blended for 5 minutes.

The blended reaction mixture was then placed in a tetrafluoroethylene jar and heated at 100° C. for 3 hours. The jar contents were filtered, washed with water and analyzed. The product consisted of pure zeolite A as determined by x-ray powder diffraction analysis (i.e., the product had an x-ray pattern essentially the same as that shown in Table A of U.S. Pat. No. 2,882,243) and had a chemical composition, expressed in terms of mole ratios of oxides, of:

$$0.8Na_2O:0.17K_2O:Al_2O_3:1.9SiO_2$$

The water capacity of this sample was 18.9 wt.% compared to 17.2 wt.% for the standard 3 Å.

EXAMPLE 2

A reaction mixture having a slurry composition, in terms of mole ratios of oxides, of:

$K_2O:Al_2O_3$—1.425
$Na_2O:Al_2O_3$—0.575

SiO$_2$:Al$_2$O$_3$—2
H$_2$O:Al$_2$O$_3$—60 was prepared by homogenizing in a blender a mixture of 105.4 g sodium silicate (28.7 wt.% Na$_2$O), 39.75 g Al$_2$O$_3$.3H$_2$O dissolved in a solution of 50.2 g KOH.0.5 H$_2$O in 60 g H$_2$O, 17.4 g of the nucleation slurry used in Example 1, 7.07 g Al$_2$(SO$_4$)$_3$.18H$_2$O dissolved in 10 g H$_2$O. Then sufficient water was added to yield a total reaction mixture weight of 400 g. After reaction at 100° C. for 1.5 hours the reaction mixture was filtered, washed and analyzed. The product obtained was a pure zeolite A as determined by x-ray powder diffraction analysis (see Example 1) and had a chemical composition, expressed in mole ratios of oxides, of:

0.33Na$_2$O:0.62K$_2$O:Al$_2$O$_3$:1.82SiO$_2$

The water capacity of this material was 18.4 wt.% compared to 17.2 wt.% for a standard 3 521.

EXAMPLE 3

A reaction mixture having a slurry composition, in terms of mole ratios of oxides, of:
K$_2$O:Al$_2$O$_3$—0.58
Na$_2$O:Al$_2$O$_3$—1.42
SiO$_2$:Al$_2$O$_3$—2
H$_2$O:Al$_2$O$_3$—60 was prepared by mixing together the following ingredients in the following amounts:
32.1 g NaOH
40.46 g Al$_2$O$_3$:3H$_2$O
117.1 g potassium silicate (brand KSil #6)
7.4 g Al$_2$(SO$_4$)$_3$.18H$_2$O
185.2 g H$_2$O
17.7 g nucleation slurry used in Example 1

After reacting the mixture for 90 minutes at 100° C. the mixture was filtered, washed, dried and analyzed. The product was pure zeolite A as determined by x-ray diffraction analysis (see Example 1) and had a chemical composition, expressed in terms of mole ratios of oxides, of:

0.74Na$_2$O:0.24K$_2$O:Al$_2$O$_3$:1.98SiO$_2$

After equilibrium with water vapour at 56% relative humidity, thermogravimetric analysis showed a water loss of 20 wt.% compared to 17.2 wt.% for a standard 3 Å molecular sieve, made from pure NaA by exchange with KCl solutions.

EXAMPLE 4

Using potassium silicate as the source of silica, a slurry of composition:

1.5K$_2$O:0.5Na$_2$O:Al$_2$O$_3$:2SiO$_2$:60H$_2$O was made by reacting together in a 600 gm batch 50.53 gm KOH.1/2H$_2$O, 16.4 gm NaOH, 61.44 gm Al$_2$O$_3$.3-H$_2$O (Alcoa C31), 184.3 gm KSil 6 (PQ Corp.) potassium silicate, 6.17 gm aluminum sulfate and 218.2 gm H$_2$O. After homogenizing the soluble compounds in a blender for 5 minutes, 30 gm of NaA product were added to the gel. After 5 hours reaction at 100° C., the product was 100% zeolite A, and remained unchanged for a further 15 hours reaction, showing no tendency to form impurities typical of longer reactions in the pure sodium zeolite A system (eg. sodalite). The sample had a water sorption capacity of 17.1 wt.% compared to a standard of 17.2 wt.%.

EXAMPLE 5

A slurry composition:

K$_2$O:Na$_2$O:Al$_2$O$_3$:2SiO$_2$:60H$_2$O was made by mixing together 33.7 gm NaOH, 53 gm KOH.0.5H$_2$O, 94.7 gm metakaolin (made from Georgia Kaolin Co. UF Kaolin) and 418.7 gm H$_2$O. After blending and homogenizing this mixture, 30 gm of NaA product were added as seeds. The mixing was placed in a 1 liter glass reaction kettle and stirred continuously. After 8 hours reaction at 100° C., the mixture had crystallized to 100% (Na, K) A zeolite. After 21 hours reaction at 100° C. no impurities were present. After drying at 125° C. and equilibrating at 25° C. overnight in a 56% relative humidity cell, the sample showed a water sorption capacity of 17.1 wt.% compared to 17.2 wt.% for a 3 Å standard. Chemical analyses of the 8 hour and 21 hour products gave zeolite stoichiometrics of:

0.45K$_2$O:0.54Na$_2$O:Al$_2$O$_3$:2.1SiO$_2$ and 0.46K$_2$O:0.53Na$_2$O:Al$_2$O$_3$2.1SiO$_2$ respectively.

EXAMPLE 6

A slurry composition:

1.8K$_2$O:0.4Na$_2$O:Al$_2$O$_3$:2SiO$_2$:60H$_2$O was made by reacting 13.3 gm metakaolin, 13.4 gm KOH.1/2H$_2$O, 3.6 NaOH and 60 gm H$_2$O. After homogenizing 0.65 gms. NaA seeds were added to the system, which was then reacted at 100° C. for 24 hours in a TEFLON bottle. The product was pure zeolite A having a water sorption capacity of 17.6 wt.%.

EXAMPLE 7

A seed solution was made by dissolving together 60.02 gms NaOH, 12.02 gms Al$_2$O$_3$.3H$_2$O and 12.0 gm H$_2$O, then adding this to 201.62 gms of a sodium silicate solution (N brand, P.Q. Corp.) diluted with 106.3 gms H$_2$O. After aging for 20 days at room temperature 2.2 gms of this solution was used to nucleate a crystallization batch made from 13.3 gm metakaolin, 11.9 gm KOH.0.5H$_2$O, 3.6 gm NaOH and 60 gms H$_2$O. The total reactant composition was: 1.54K$_2$O: 0.83Na$_2$O:Al$_2$O$_3$:2.06SiO$_2$:61H$_2$O. The sample was aged for 14 hours at 100° C. The product was pure A zeolite having high crystallinity, and a water sorption capacity of 18 wt.%. Chemical analyses showed the product K,NaA to have the stoichiometry:

0.64K$_2$O:0.36Na$_2$O:Al$_2$O$_3$:2SiO$_2$

In all of these examples the K/(Na+K) selectivity factor is about 1.1 between reaction mixture and product. The ratio of K to Na in the product can therefore be controlled by specifying the initial ratio of K to Na in the reaction mixture. The correlation is shown in FIG. 1, which represents a plot of the ratio of K to the sum of Na+K in the slurry versus the ratio of K to the sum of Na+K in the product using Examples 1-3, 5 and 6 as data points.

In summary, the present invention is seen to provide a process for preparing zeolite A containing potassium and sodium cations by a direct route where the ratio of potassium to potassium and sodium in the reaction mixture controls the ratio in the product. The seeding described herein permits zeolite A to be produced rather than the expected zeolite F.

What is claimed is:

1. A process for directly preparing a Type 3A zeolite containing sodium and potassium ions comprising the steps of:
    (a) preparing a reaction mixture comprising sodium silicate, potassium silicate, water, a source of alumina, and adding a seed source, said seed source comprising Type A zeolites, and the reaction mixture having a composition, expressed in mole ratios of oxides, within the ranges:

$(Na_2O+K_2O):Al_2O_3$—1.4 to 2.1
    $SiO_2:Al_2O_3$—1.8 to 2.5
    $H_2O:Al_2O_3$—40 to 100
    $Na_2O:Al_2O_3$—0.3 to 1.0
    $K_2O:Al_2O_3$—1.3 to 1.7

(b) maintaining the reaction mixture at a temperature of between about 60° and 120° C. for a time sufficient to form a substantially pure crystalline zeolite 3A product, and
    (c) recovering a substantially pure Type 3A zeolite from the reaction mixture.

2. The process of claim 1 wherein the seed source is present in the reaction mixture in an effective amount of up to 20% by weight of the reaction mixture.

3. The process of claim 1 wherein after step (a) but before step (b) the reaction mixture is blended sufficiently to form a substantially homogeneous mixture.

4. The process of claim 1 wherein the reaction mixture is maintained at a temperature of 80° to 100° C. for up to 24 hours.

5. The process of claim 1 wherein the reaction mixture has a composition, expressed in mole ratios of oxides, within the ranges:

$Na_2O:Al_2O_3$—0.3 to 1.0
    $K_2O:Al_2O_3$—1.3 to 1.7
    $SiO_2:Al_2O_3$—1.9 to 2.2
    $H_2O:Al_2O_3$—50 to 80.

6. The process of claim 2 wherein the zeolite product has a K/Na ratio greater than unity.

* * * * *